2,828,213
atented Mar. 25, 1958

2,828,213

NON-FLAMMABLE CORROSION PREVENTIVE COMPOSITIONS

Loren L. Neff, Fullerton, and William L. Wasley, Santa Ana, Calif., assignors to Union Oil Company of California, Los Angeles, Calif., a corporation of California No Drawing. Application November 19, 1954
Serial No. 470,129

13 Claims. (Cl. 106—14)

This invention relates to non-flammable corrosion preventive compositions suitable for application to ferrous metal surfaces. More specifically, this invention relates to non-flammable corrosion preventive compositions comprising a volatile solvent and a non-drying film-forming composition consisting of a resinous material, a sulfonate and a partial ester of a polyhydric alcohol which compositions when applied to ferrous metal surfaces effectively prevent atmospheric corrosion of such surfaces. The invention relates not only to the solvent solutions of the non-volatile corrosion preventive film-forming compositions but to the non-volatile, non-flammable compositions themselves.

In petroleum refineries, chemical plants, and the like, it is often necessary to shut down fractionating, processing or treating units, including tanks, storage vessels, lines, and the like, for purposes of repairing and/or modifying the units. In such cases, particularly where it is important that surfaces, particularly internal surfaces, of such units be protected from rusting or other corrosion, it is desirable to coat the surfaces of such equipment with a material which prevents corrosion such as rusting or the like. It is often essential that the protective coating be one which will not burn or volatilize to give an explosive mixture during welding, brazing, torch cutting, or the like. Moreover, it is highly desirable that the composition used to protect the surfaces of the unit be applied in the form of a solution in a volatile solvent which is non-flammable and thus permits application to the metal surfaces without shutting down neighboring equipment in which furnaces, heaters, or the like may be in operation. It is important also that the coating left as a result of treatment with the composition be removable with relatively inexpensive hydrocarbon solvents. Thus following completion of repairs, modification, or the like, it is highly desirable to be able to remove the coating inside the unit by merely exposing it to the heated vapors of light petroleum solvents or to liquid petroleum solvents. It is desirable that the coating following evaporation of the solvent be a non-brittle, non-tacky solid film which is highly adherent to the metal surfaces thus permitting handling of the coated surfaces without removal of the protective film.

It is therefore an object of this invention to provide a corrosion preventive composition suitable for application to ferrous metal surfaces which composition is non-flammable and produces an adherent, solid, non-tacky, non-flammable coating which coating is easily removable with hydrocarbon solvents.

It is another object to provide a non-flammable composition having corrosion preventive properties and capable of preventing rusting and the like of ferrous metal surfaces when applied in a relatively thin film to such surfaces, which composition is soluble in volatile, non-flammable solvents and in hydrocarbon solvents such as in petroleum naphthas, thinners and the like.

It is found that a corrosion preventive compound meeting all of the above requirements may be prepared by heating and stirring a mixture of approximately 85–97% by weight of a highly chlorinated polyphenyl, e. g., polychlorinated terphenyl, 1.5–7.5% by weight of an alkali metal, alkaline earth metal or non-metal petroleum sulfonate, e. g., sodium sulfonate, and 1.5–7.5% by weight of a relatively high molecular weight partial ester of a polyhydric alcohol, e. g., sorbitan monooleate. This composition may be used to coat metal surfaces by heating until the mixture is melted and then dipping the metal in the molten liquid. It is preferable to dissolve the mixture in approximately 2 to 4 parts by weight of a volatile non-flammable solvent, e. g., carbon tetrachloride. The resulting solutions are readily applied to metal surfaces without danger of explosion or fire hazard by means of dipping, or brush or spray application. Upon evaporation of the solvent a protective film is left which effectively prevents corrosion of the surfaces to which it is applied. The coating produced is a hard, non-tacky, abrasion resistant film which is produced by evaporation of solvent. The coating does not have drying properties.

A specific formulation of this invention which has been found to perform entirely satisfactorily in both laboratory tests and in large scale service is as follows:

| | Percent by weight |
|---|---|
| Chlorinated terphenyl (approximately 60% chlorine) | 22.8 |
| Sodium petroleum sulfonate (a commercial product containing approximately 60% of sodium sulfonate in mineral oil) | 0.6 |
| Sorbitan monooleate | 0.6 |
| Carbon tetrachloride | 76.0 |

This corrosion preventive composition was prepared by dissolving the chlorinated terphenyl, sodium sulfonate and sorbitan monooleate in the carbon tetrachloride at ordinary temperatures. The laboratory test used to evaluate this and other non-flammable compositions is described hereinbelow and the results of the test are shown in Table II, composition 4. The large scale service test on this material is described herebelow.

Following the shutdown of an oil refinery unit consisting of vessels, lines, fractionating towers and the like, for modification and repairs the interior surfaces of some of the vessels, towers, etc. where sandblasted. Because of the tendency for such surfaces to rust badly in relatively short periods of time following sandblasting, the interior surfaces of the vessels etc., including those which had been sandblasted as well as those which were not sandblasted, were coated with the composition set forth above. The coating was effected without the necessity of shutting down neighboring units which would have required shutdown had a flammable composition been employed. Moreover, during the shutdown it was necessary to carry out certain torch-cutting and welding operations on the coated equipment. These operations were carried out without fire or explosion hazard. It was observed that during a period of approximately 3 months following the application of the corrosion preventive coating no rusting or corrosion occurred on the sandblasted surfaces and no additional rusting was observed on those surfaces which were not sandblasted. The protective coating was removed just prior to activating the unit by circulating hot butane through the equipment.

Although chlorinated terphenyl, having a chlorine content of about 60% by weight, was shown to be used as the main solid, non-volatile constituent of the composition made and tested as described above, other chlorinated di- or polyphenyls may be employed in place of chlorinated terphenyl, provided the chlorinated material is of a resinous character, and the resulting products will have the characteristics described. Generally the chlorinated polyphenyls will have a chlorine content between about 55% and about 70% by weight where such chlorine contents result in the formation of a solid product. If the chlorine content is appreciably less than about 50-55%, the products are liquid or tacky semi-solids and are not suitable for use in the above compositions. A chlorinated polyphenyl containing approximately 65% by weight of chlorine produced by chlorinating a mixture of polyphenyls consisting mainly of diphenyl benzenes when substituted for the chlorinated terphenyl in the composition described above gave a composition having the desirable physical characteristics and the corrosion preventive properties of the composition described and tested in actual service.

In place of the sodium petroleum sulfonate employed in the above described composition, other metal sulfonates, particularly alkali or alkaline earth metal petroleum sulfonates, e. g., potassium, lithium, calcium, strontium, barium, and magnesium sulfonates have been used and the compositions containing these sulfonates are found to be entirely satisfactory. In some instances the heavy metal sulfonates may be used but they are not to be considered equivalent to the above sulfonates. Heavy metals may include lead, aluminum, nickel, zinc, etc. The sulfonates are preferably derived from the oil-soluble, so-called "mahogany" sulfonic acids. It is not essential that the sulfonic acids be free from the water-soluble or so-called "green" sulfonic acids. The total sulfonation product of mineral oil fractions comprising both the "mahogany" and the "green" sulfonic acids may be employed with entirely satisfactory results. Further with respect to sulfonates, it is found that the so-called ashless sulfonates such as ammonium sulfonate, substituted ammonium sulfonates, guanidine sulfonate, biguanide sulfonate, and the hydrocarbon substituted guanidine and biguanide sulfonates when used in place of the sodium sulfonate or other metal sulfonates give corrosion preventive compositions having the desirable characteristics described herein.

Other esters which may be substituted for the sorbitan monooleate in the above compositions to give equally satisfactory compositions include partial esters of polyhydric alcohols such as sorbitan trioleate, sorbitan mono and distearate, pentaerythritol monooleate, glycerol monooleate, pentaglycerol dioleate, and the like. In general, partial esters of polyhydric alcohols having at least 3 hydroxyl groups and in which the acid radicals present in the ester are derived from aliphatic acids containing from about 12 to about 24 carbon atoms are entirely suitable for use in place of the sorbitan monooleate. The aliphatic acids may be saturated or unsaturated.

Solvents which have been found to be entirely satisfactory are the relatively volatile chlorinated low molecular weight hydrocarbons. These compounds include, in addition to carbon tetrachloride, chloroform and ethylene dichloride.

Proportions of constituents desirably present in the corrosion preventive compositions are shown in Table I.

*Table I*

| | Corrosion Inhibitor Composition, Percent by Weight | | | |
|---|---|---|---|---|
| | Solvent Free | | With Solvent | |
| | Over-all Range | Preferred | Over-all Range | Preferred |
| Chlorinated polyphenyl | 85-97 | 95 | 17-30 | 22.8 |
| Petroleum sulfonate | 1.5-7.5 | 2.5 | 0.3-2.5 | 0.6 |
| Partial ester of polyhydric alcohol | 1.5-7.5 | 2.5 | 0.3-2.5 | 0.6 |
| Total non-volatile materials | | | 17.6-33 | 24.0 |
| Chlorinated solvent | | | 67.0-82.4 | 76.0 |

In order to evaluate the various corrosion preventive compositions typical of this invention and in order to compare these compositions with compositions containing less than the total number of components found to be desirable in the finished compositions, the following corrosion tests were carried out. Polished mild steel rods 0.5 inches in diameter by 4 inches long were dipped into the formulations under test, allowed to dry at room temperature for one hour, and suspended in a humidity cabinet operated in accordance with the National Military Establishment Specification JAN-H-792 except that the operating temperature was 77° F. instead of 120° F. In this humidity cabinet test a relative humidity of 95-100% is maintained by bubbling air through a layer of distilled water maintained in the bottom of the cabinet and the humidified air is passed upward over the rods which are suspended by means of wires at approximately 15 inches above the water.

The results of these tests are summarized in the following table in which the condition of the rods after 8 days exposure in the humidity cabinet is described. The condition of the rods was determined visually and the rods were rated as follows in the order of increasing amount of rust: trace, slight, light, moderate, heavy. In those instances in which the condition of the rod was described as showing a trace of rust the protection was considered to be adequate. This rating was given when only a few extremely small rust spots were observed on the test rod.

*Table II*

| | Composition | | | | | | Condition of Rods After 8 Days in Humidity Cabinet |
|---|---|---|---|---|---|---|---|
| | Film Forming Material | | Corrosion Preventive Additive | | Solvent | | |
| | Type | Percent by Wt. | Type | Percent by Wt. | Type | Percent by Wt. | |
| | Untreated polished mild steel rod | | | | | | moderate rust. |
| 1 | Chlorinated[a] terphenyl | 23.0 | None | | CCl₄ | 77.0 | heavy rust. |
| 2 | do | 22.8 | Sodium sulfonate[b] | 1.2 | CCl₄ | 76.0 | moderate rust. |
| 3 | do | 22.8 | Sorbitan monooleate | 1.2 | CCl₄ | 76.0 | Do. |
| 4 | do | 22.8 | Sodium sulfonate[b] / Sorbitan monooleate | 0.6 / 0.6 | CCl₄ | 76.0 | trace rust. |
| 5 | do | 23.0 | None | | CHCl₃ | 77.0 | light rust. |
| 6 | do | 22.8 | Sodium sulfonate[b] / Sorbitan monooleate | 0.6 / 0.6 | CHCl₃ | 76.0 | trace rust. |
| 7 | do | 23.0 | None | | C₂H₄Cl₂[c] | 77.0 | slight rust. |
| 8 | do | 22.8 | Sodium sulfonate[b] / Sorbitan monooleate | 0.6 / 0.6 | C₂H₄Cl₂[c] | 76.0 | trace rust. |

[a] A commercial product containing 60% by weight of chlorine.
[b] A commercial sodium petroleum sulfonate containing approximately 60% by weight of sodium mahogany sulfonate in mineral oil.
[c] Ethylene dichloride.

The above results show that in order to obtain good corrosion protection it is essential that the composition contain both a sulfonate and a partial ester of the type described herein in combination with the chlorinated polyphenyl. Thus composition 1 containing only the chlorinated terphenyl showed more rusting than was observed on the uncoated steel rod and compositions 2 and 3 containing 1.2% of sodium sulfonate and 1.2% of sorbitan monooleate, respectively, did not give satisfactory protection whereas composition 4 containing 0.6% of sodium sulfonate and 0.6% of sorbitan monooleate together with the chlorinated terphenyl gave entirely satisfactory protection. There appears to be a synergistic effect when these two additive materials, i. e., the sulfonate and the partial ester are employed in combination with the chlorinated polyphenyl.

All of the compositions described in the above table were found to be non-flammable even when heated to the boiling point. Moreover, coatings left on metal surfaces upon evaporation of the solvent did not burn with a flame even when an acetylene torch was applied to the coating. Furthermore, all of the above coatings were soluble in and easily removed by treatment with light petroleum solvents, e. g., petroleum ether, petroleum naphtha and the like.

The following compositions are representative of the corrosion preventive compositions of this invention. These compositions are all non-flammable and give the desired protection when applied to ferrous metal surfaces.

|  | Percent by weight |
|---|---|
| I. Chlorinated diphenyl (65% chlorine) | 91.0 |
| Calcium petroleum sulfonate (approximately 40% calcium sulfonate in oil) | 5.0 |
| Glycerol monooleate | 4.0 |
| II. Composition I | 25.0 |
| Carbon tetrachloride | 75.0 |
| III. Chlorinated mixture of diphenyl benzenes (60% chlorine) | 95.0 |
| Sodium petroleum sulfonate | 2.5 |
| Pentaerythritol monooleate | 2.5 |
| IV. Composition III | 22.0 |
| Ethylene dichloride | 78.0 |
| V. Chlorinated mixture of polyphenyls (63% chlorine) | 22.0 |
| Ammonium petroleum sulfonate | 0.6 |
| Pentaglycerol monostearate | 0.6 |
| Carbon tetrachloride | 76.8 |

It is to be understood that in the compositions described herein a mixture of volatile chlorinated solvents may be used in place of a single solvent. Moreover, one or more types of chlorinated diphenyls or polyphenyls may be used and mixtures of sulfonates as well as mixtures of partial esters may be used in preparing the corrosion inhibitors. The total amount of each constituent, whether it be a single compound or a mixture of two or more compounds, will be the amount indicated herein for the single constituents.

The above description and examples are illustrative of this invention but are not to be taken as limiting the invention to the particular compositions described since variations may be made by those skilled in the art without departing from the spirit and scope of the invention.

We claim:

1. A non-flammable rust preventive composition suitable for application to ferrous metal surfaces, to form a solid, non-brittle, non-tacky adherent coating thereon, which comprises from about 85% to about 97% by weight of a highly chlorinated polyphenyl, between about 0.5% and about 7.5% by weight of a petroleum sulfonate and between about 1.5% and about 7.5% by weight of a relatively high molecular weight partial ester of a polyhydric alcohol said chlorinated polyphenyl being a solid compound containing between about 50% and about 70% by weight of chlorine.

2. A composition according to claim 1 in which the highly chlorinated polyphenyl is a chlorinated terphenyl containing approximately 60% by weight of chlorine.

3. A composition according to claim 1 in which the petroleum sulfonate is a metal petroleum sulfonate.

4. A composition according to claim 3 in which said metal petroleum sulfonate is sodium sulfonate.

5. A composition according to claim 1 in which said high molecular weight partial ester of a polyhydric alcohol is sorbitan monooleate.

6. A composition according to claim 1 in which the petroleum sulfonate is sodium mahogany sulfonate and the high molecular weight partial ester of a polyhydric alcohol is sorbitan monooleate.

7. A non-flammable corrosion preventive composition suitable for application to ferrous metal surfaces, to form a solid, non-brittle, non-tacky adherent coating thereon, which comprises between about 67% and about 82.4% by weight of a solvent consisting of a volatile, non-flammable chlorinated low molecular weight hydrocarbon, and between about 17.6% and about 33% by weight of a film-forming composition consisting of between about 85% and about 97% by weight of a highly chlorinated polyphenyl, between about 1.5% and about 7.5% by weight of a petroleum sulfonate and between about 1.5% and about 7.5% by weight of a relatively high molecular weight partial ester of a polyhydric alcohol said chlorinated polyphenyl being a solid compound containing between about 50% and about 70% by weight of chlorine.

8. A composition according to claim 7 in which said chlorinated polyphenyl is a chlorinated terphenyl containing approximately 60% by weight of chlorine and in which said partial ester of a polyhydric alcohol is sorbitan monooleate.

9. A non-flammable corrosion preventive composition suitable for application to ferrous metal surfaces, to form a solid, non-brittle, non-tacky adherent coating thereon, which comprises between about 67% and about 82.4% by weight of a non-flammable solvent consisting of a volatile chlorinated low molecular weight hydrocarbon, between about 17% and about 30% by weight of a chlorinated polyphenyl containing between about 55% and about 70% by weight of chlorine, between about 0.3% and 2.5% by weight of a petroleum sulfonate and between about 0.3% and about 2.5% by weight of a partial ester of a polyhydric alcohol.

10. A corrosion preventive composition according to claim 9 in which said partial ester of a polyhydric alcohol is a fatty acid ester in which each acid radical contains between about 12 and about 24 carbon atoms.

11. A non-flammable corrosion preventive composition according to claim 9 in which said chlorinated polyphenyl is a chlorinated terphenyl containing approximately 60% by weight of chlorine.

12. A non-flammable corrosion preventive composition according to claim 9 in which said petroleum sulfonate is an alkali metal mahogany sulfonate.

13. A non-flammable corrosion preventive composition suitable for application to ferrous metal surfaces, to form a solid, non-brittle, non-tacky adherent coating thereon, which comprises approximately 76% by weight of a volatile non-flammable solvent consisting of a chlorinated low molecular weight hydrocarbon, about 22.8% by weight of chlorinated terphenyl containing approximately 60% by weight of chlorine, about 0.6% of sodium petroleum sulfonate and about 0.6% by weight of sorbitan monooleate.

(References on following page)

References Cited in the file of this patent

UNITED STATES PATENTS

| | | |
|---|---|---|
| 2,357,725 | Bennett | Sept. 5, 1944 |
| 2,532,616 | Hardy | Dec. 5, 1950 |
| 2,672,444 | Wasson et al. | Mar. 16, 1954 |
| 2,687,965 | Schiermeyer | Aug. 31, 1954 |
| 2,716,611 | Paxton | Aug. 30, 1955 |

OTHER REFERENCES

Stewart National Paint Dictionary, 3rd ed., Stewart Research Lab., Washington, D. C., 1948 (page 53 relied on).